United States Patent
Kessler et al.

(10) Patent No.: US 6,789,147 B1
(45) Date of Patent: Sep. 7, 2004

(54) INTERFACE FOR A SECURITY COPROCESSOR

(75) Inventors: Richard E. Kessler, Shrewsbury, MA (US); David A. Carlson, Haslet, TX (US); Muhammad Raghib Hussain, Pleasanton, CA (US); Robert A. Sanzone, Hudson, MA (US); Khaja E. Ahmed, Pleasanton, CA (US); Michael D. Varga, Milpitas, CA (US)

(73) Assignee: Cavium Networks, Santa Clara, CA (US)

(*) Notice: Subject to any disclaimer, the term of this patent is extended or adjusted under 35 U.S.C. 154(b) by 401 days.

(21) Appl. No.: 10/025,512

(22) Filed: Dec. 19, 2001

Related U.S. Application Data

(60) Provisional application No. 60/307,643, filed on Jul. 24, 2001.

(51) Int. Cl.[7] .......................... G06F 9/00; G06F 12/00; G06F 13/00
(52) U.S. Cl. .......................... 710/200; 713/200; 712/34
(58) Field of Search .......................... 710/22, 52, 39, 710/200; 713/200; 711/163; 712/215, 221, 34; 705/405; 707/8; 709/201; 717/149

(56) References Cited

U.S. PATENT DOCUMENTS

| | | | |
|---|---|---|---|
| 5,581,763 A | * 12/1996 | Hait | 713/200 |
| 5,630,057 A | * 5/1997 | Hait | 713/200 |
| 5,805,711 A | * 9/1998 | Windel et al. | 380/55 |
| 5,930,832 A | * 7/1999 | Heaslip et al. | 711/207 |
| 5,953,502 A | 9/1999 | Helbig, Sr. | |
| 6,295,645 B1 | 9/2001 | Brewer | |
| 6,373,846 B1 | 4/2002 | Daniel et al. | |
| 6,378,072 B1 | 4/2002 | Collins et al. | |

OTHER PUBLICATIONS

"Multi–view memory to support OS locking for transaction systems" by Bodorik, P. and Jutla, D.N. (abstract only).*
How SSL Woks, http://developer.netscape.com/tech/security/ssl/howitworks.html, 5 pages, 1999.
Internet Key Exchange Security Protocol, Cisco Systems Inc., http://www.cisco.com/univercd/cc/td/doc/product/software/ios113ed/113t_3/isakmp.htm, 45 pages, 1989–1998.

* cited by examiner

*Primary Examiner*—Gopal C. Ray
(74) *Attorney, Agent, or Firm*—Blakely, Sokoloff Taylor & Zafman LLP

(57) ABSTRACT

A method and apparatus for processing security operations are described. In one embodiment, a processor includes a number of execution units to process a number of requests for security operations. The number of execution units are to output the results of the number of requests to a number of output data structures associated with the number of requests within a remote memory based on pointers stored in the number of requests. The number of execution units can output the results in an order that is different from the order of the requests in a request queue. The processor also includes a request unit coupled to the number of execution units. The request unit is to retrieve a portion of the number of requests from the request queue within the remote memory and associated input data structures for the portion of the number of requests from the remote memory. Additionally, the request unit is to distribute the retrieved requests to the number of execution units based on availability for processing by the number of execution units.

46 Claims, 10 Drawing Sheets

| MACRO SECURITY OPERATIONS | PRIMITIVE SECURITY OPERATIONS |
|---|---|
| SECURITY NEGOTIATION OPERATION | 2 partial hash OPERATIONS (1 MD5 and 1 SHA1) |
| KEY EXCHANGE OPERATION | 1 - RSA OPERATION<br><br>20 Hash OPERATIONS (10 MD5 + 10 SHA1) for SSL 3.0<br><br>76 Hash OPERATIONS (40 MD5 + 36 SHA1) for SSL 3.1<br><br>2 partial hash OPERATIONS (1 MD5 and 1 SHA1) |
| FINISHED OPERATION | 1 - decrypt OPERATION (RC4 or 3DES or DES or AES)<br><br>2 – hash OPERATIONS for MAC (either MD5 or SHA1)<br><br>4 – hash OPERATIONS (2 MD5 + 2 SHA1)<br><br>4 – hash OPERATIONS (2 MD5 + 2 SHA1)<br><br>1 - encrypt OPERATION (RC4 or 3DES or DES or AES)<br><br>2 – hash OPERATIONS for MAC (either MD5 or SHA1) |

FIG. 5

| MACRO SECURITY OPERATION | PRIMITIVE SECURITY OPERATIONS |
|---|---|
| FULL HANDSHAKE OPERATION | 1 - RSA OPERATION |
| | 20 Hash OPERATIONS (10 MD5 + 10 SHA1) for SSL 3.0 |
| | 76 Hash OPERATIONS (40 MD5 + 36 SHA1) for SSL 3.1 |
| | 6 – hash OPERATIONS (3 MD5 + 3 SHA1) |
| | 1 – encrypt OPERATION ((A)RC4 or 3DES or DES or AES) |
| | 6 – hash OPERATIONS (3 MD5 + 3 SHA1) |
| | 1 - encrypt OPERATIONS ((A)RC4 or 3DES or DES or AES) |
| | 2 – hash OPERATIONS for MAC (either MD5 or SHA1) |

FIG. 7

INTERFACE FOR A SECURITY COPROCESSOR

CROSS REFERENCE TO RELATED APPLICATION

This application claims the benefit of U.S. provisional patent application No. 60/307,643 entitled "Interface for a Security Coprocessor," filed Jul. 24, 2001.

FIELD OF THE INVENTION

The invention relates to the field of processing. More specifically, the invention relates to an interface for a security coprocessor.

BACKGROUND OF THE INVENTION

Communication networks and the number of users of such networks continue to increase. Moreover, on-line sales involving both business-to-business and business to consumer over the Internet continues to proliferate. Additionally, the number of people that are telecommuting continues to grow. Both on-line sales and telecommuting are examples of usage of communication networks that typically involve private and sensitive data that needs to be protected during its transmission across the different communication networks.

Accordingly, security protocols (e.g., Transport Layer Security (TLS), Secure Sockets Layer (SSL) 3.0, Internet Protocol Security (IPSec), etc.) have been developed to establish secure sessions between remote systems. These security protocols provide a method for remote systems to establish a secure session through message exchange and calculations, thereby allowing sensitive data being transmitted across the different communication networks to remain secure and untampered.

FIG. 1 illustrates a two phase client/server exchange to establish a secure session. In a first phase 105, the security negotiation phase, a network element 101 (the client) and a network element 103 (the server) exchange messages to negotiate security between the two network elements 101 and 103. The negotiation of security includes determining the algorithms (e.g., hashing algorithms, encryption algorithms, compression algorithms, etc.) to be employed by the two network elements 101 and 103. In a second phase 107, a key exchange phase, the network elements 101 and 103 exchange key information. The second phase 107 comprises the network elements 101 and 103 exchanging messages based on a selected public key algorithm and authenticating received messages. While the specific primitive tasks of these two phases vary for different security protocols, the primitive tasks for establishing a secure session can include the receiving of messages, transmitting of messages, generating of keys, generating of secrets, hashing of data, encrypting of data, decrypting of data, and calculating of random numbers.

Performing the tasks to establish a secure session is processor intensive. If a general purpose processor, acting as the host processor for a network element, performs these tasks, then the network element's system performance will suffer because resources will be consumed for the tasks. The results of poor system performance can impact a network and users in various ways depending on the function of the network element (e.g., routing, switching, serving, managing networked storage, etc.).

Coprocessors have been developed to offload some of the tasks from the host processor. Some coprocessors have been developed to perform a specific primitive task for the host processor (e.g., hash data). The addition of a task specific coprocessor does not offload from the host processor a significant amount of the secure session establishment tasks. One alternative is to add multiple coprocessors to a network element, each performing a different task. Such an alternative is limited by physical constraints (e.g., number of slots to connect cards) and introduces the problem of multiple communications between the host processor and the multiple coprocessors.

Other coprocessors have been developed to perform more than one of the tasks required to establish a secure session. Assume a coprocessor can perform a cryptographic operation (i.e., an encrypt or decrypt), a key material generation operation, and a hash operation. For example, assume a server has received a request to establish an SSL 3.0 session. The server must call the coprocessor to decrypt a pre-master secret received from a client. To generate a master secret and key material, the host processor must make 20 calls to the coprocessor (one for each hash operation). In just the beginning of establishing a single secure session, the host processor has made 21 calls to the multiple task coprocessor. As illustrated by this example, a coprocessor that can perform multiple tasks does not solve the issue of resource consumption from multiple communications between the host processor and the coprocessor.

Despite the addition of these coprocessors, a large amount of resources are still consumed with establishing secure sessions. Establishment of a secure session may suffer from latency caused by multiple communications between the host processor and a multiple task coprocessor or multiple single task coprocessors. Multiple communications between the CPU and coprocessors consumes system resources (e.g., bus resources, memory resources, clock cycles, etc.). The impact to the system can include limitation of 1) the number of secure sessions which can be served and 2) the number of concurrent secure sessions that can be maintained by the system.

SUMMARY OF THE INVENTION

A method and apparatus for processing security operations are described. In one embodiment, a processor includes a number of execution units to process a number of requests for security operations. The number of execution units are to output the results of the number of requests to a number of output data structures associated with the number of requests within a remote memory based on pointers stored in the number of requests. The number of execution units can output the results in an order that is different from the order of the requests queue. The processor also includes a request unit coupled to the number of execution units. The request unit is to retrieve a portion of the number of requests from the request queue within the remote memory and associated input data structures for the portion of the number of requests from the remote memory. Additionally, the request unit is to distribute the retrieved requests to the number of execution units based on availability for processing by the number of execution units.

In one embodiment, a method executes on a host processor. The method includes storing a number of requests for security operations within a request queue within a host memory, wherein the number of requests are in an order within the request queue. The method includes storing data related to the number of requests for security operations into a number of input data structures within the host memory. The method also includes allocating a number of output data structures within the host memory, wherein a coprocessor is to write results of the number of requests for the security operations into the number of output data structures. The coprocessor can write the results in an order that is different from the order of the requests within the request queue. Additionally, for each of the number of requests, a thread for execution on the host processor is allocated, wherein the thread periodically checks a value of a completion code stored in the output data structure for the associated request. The completion code indicates that the request is completed by the coprocessor.

In an embodiment, a method includes retrieving, by a request unit, a number of requests for security operations for a host memory, wherein the number of requests are in an order within the host memory. The method also includes distributing, by the request unit, the number of requests for the security operations to a number of execution units. The distribution is based on availability of the number of execution units. Additionally, the method includes processing the number of requests for the security operations by the number of execution units. The method includes outputting results of the number of requests for the security operations to locations within the host memory, wherein an order of outputting of the results can be different from the order of the requests within the host memory.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, host processor 202 can be located in FIG. 2. However, element numbers are the same for those elements that are the same across different Figures.

In the drawings:

FIG. 5 is a table illustrating groups of primitive security operations for the macro security operations illustrated in FIG. 4 according to one embodiment of the invention.

FIG. 7 is a table illustrating a group of primitive operations for the server full handshake operation 701 according to one embodiment of the invention.

DETAILED DESCRIPTION

A method and apparatus for processing security operations are described. In the following description, numerous specific details are set forth to provide a thorough understanding of the invention. However, it is understood that the invention may be practiced without these specific details. In other instances, well-known circuits, structures and techniques have not been shown in detail in order not to obscure the invention. Although described embodiments of the invention refer to the SSL 3.0 protocol, alternative embodiments can be applied to other security protocols, such as IPSec, TLS, etc.

In the specification, the term "security operation" can be a primitive security operation or a macro security operation. A primitive security operation can be a decrypt operation, an encrypt operation, a hash operation, or a group of arithmetic operations for generating a value (e.g., a secret, key material, etc.). A macro security operation is a group of primitive security operations.

Overview

One aspect of the invention is the communication of tasks and results between a host processor and a security coprocessor, where the coprocessor has multiple execution units. Another aspect of the invention is the type of tasks, specifically macro security operations, that can be transferred by a host processor to a security coprocessor, where the coprocessor has multiple execution units. These two aspects can be used together. For example, in one embodiment, a security coprocessor with multiple execution units receives requests and provides results through a continuous flow mechanism. The received requests are treated as independent of each other, are distributed to available ones of the multiple execution units in-order, can be macro security operations, can take different amounts of time to complete, and can be completed/returned out-of-order. While these two aspects can be used together, they are independent of each other. In other words, macro security operations can be used with different (e.g., prior art) techniques for communicating tasks and results between a host processor and a security coprocessor; and vice versa.

System Description

Figure 1:
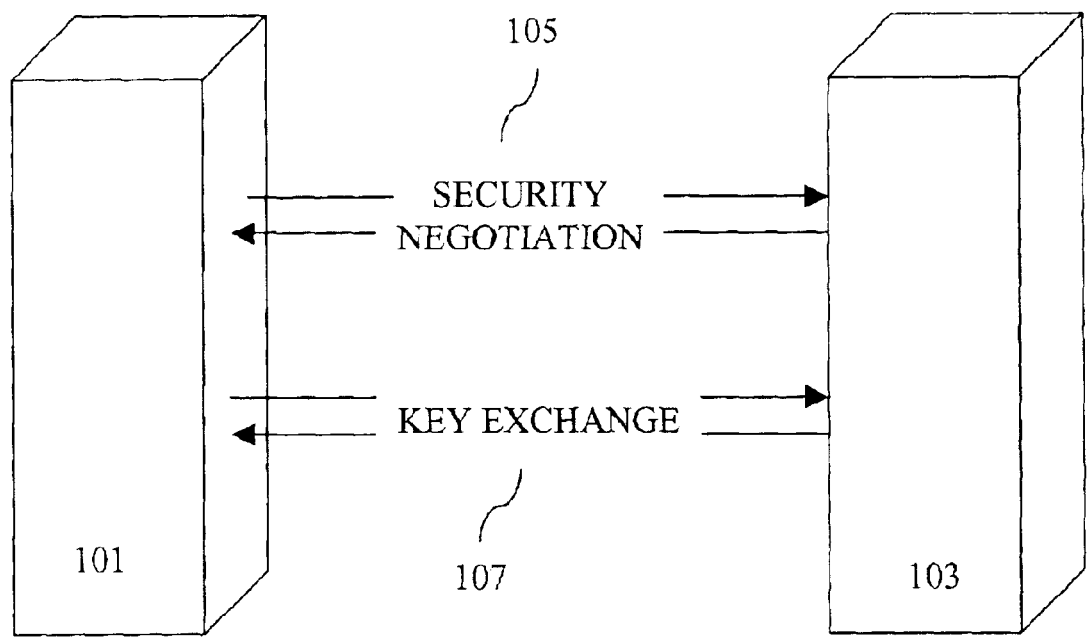
FIG. 1 illustrates a two phase client/server exchange to establish a secure session.
Figure 2:
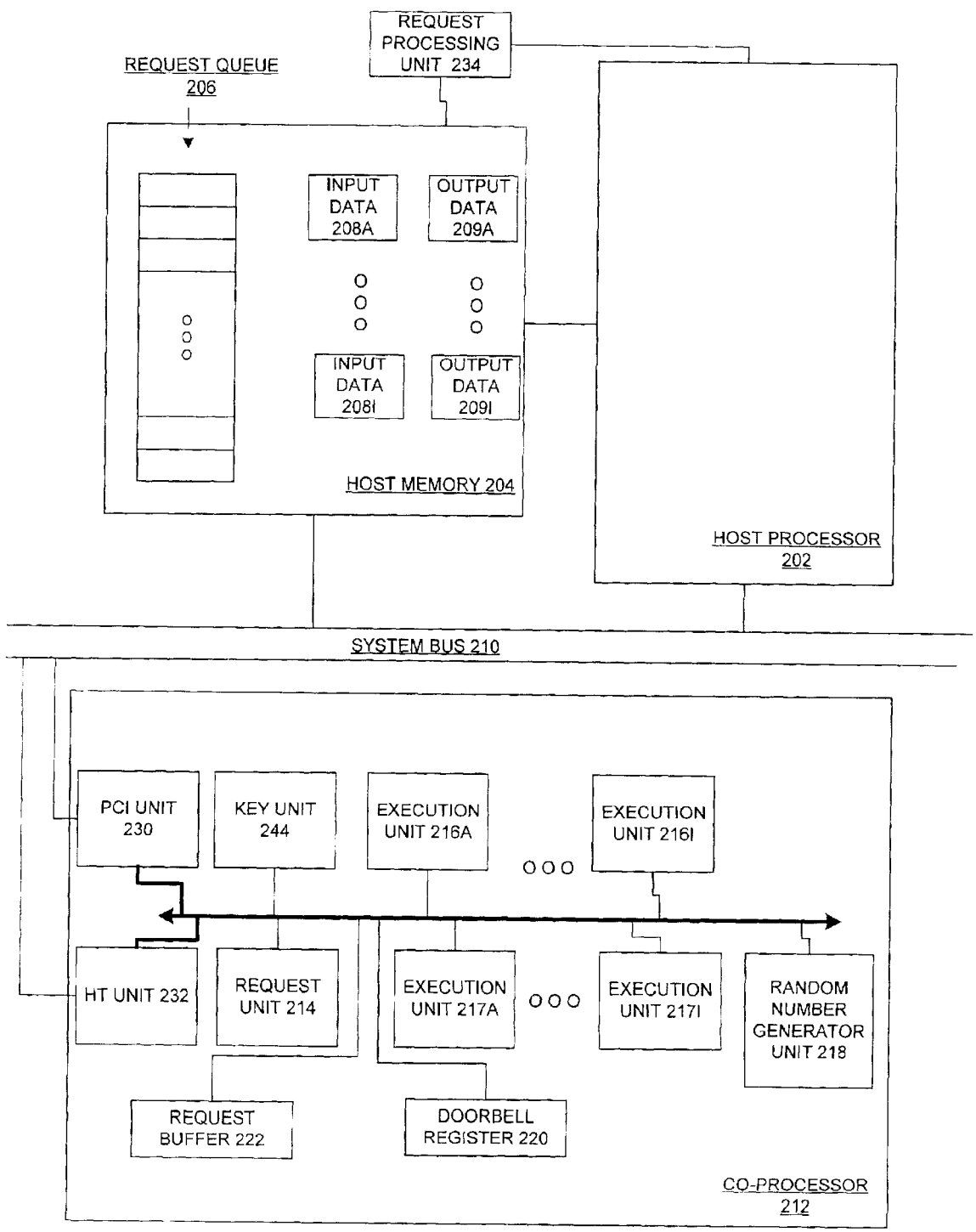
FIG. 2 is a block diagram illustrating a system for processing of security operations, according to embodiments of the present invention.

FIG. 2 is a block diagram illustrating a system for processing of security operations, according to embodiments of the present invention. FIG. 2 includes host processor 202, host memory 204, coprocessor 212 and request processing unit 234. Host processor 202, host memory 204 and coprocessor 212 are coupled to system bus 210. Additionally, host processor 202, host memory 204 and request processing unit 234 are coupled together. In an embodiment, request processing unit 234 can be a process or task that can reside within host memory 204 and/or host processor 202 and can be executed within host processor 202. For example, request processing unit 234 may be a driver fro the coprocessor executed by the host processor, wherein the driver interfaces with Open SSL. However, embodiments of the present invention are not so limited, as request processing unit 234 can be different types of hardware (such as digital logic) executing the processing described therein.

Host memory 204 store request queue 206, input data 208A–208I and output data 209A–209I. Request queue 206 is illustrated and described in terms of a queue. However, embodiments of the present invention are not so limited, as request queue 206 can be any other type of data structure for storage of requests to be transmitted to coprocessor 212, which is described in more detail below. In one embodiment, request queue 206 is a circular queue (ring buffer). In an embodiment, the write pointer for request queue 206 is maintained by request processing unit 234 and the read pointer for request queue 206 is maintained by request unit 214 of coprocessor 212. Accordingly, request processing unit 234 increments its write pointer when storing requests into request queue 206, while request unit 214 decrements its read pointer when extracting or retrieving requests from request queue 206.

Additionally, although input data 208A–208I and output data 209A–209I are data structures that are described as tables, such data can be stored in other types of data structures, such as data objects in an object-oriented environment. In one embodiment, input data 208A–208I are contiguously stored in host memory 204. Accordingly, request unit 214 within coprocessor 212 can extract the input data across multiple requests using one direct memory access (DMA) read operation, which is described in more detail below.

Requests inserted into request queue 206 by request processing unit 234 can include instructions, such as an operation code, the data to be operated on as well as a pointer to other locations in host memory 204 storing data (which is related to the request) that could not be placed into the request inside request queue 206, due to restraints on the size of the requests. In particular, requests within request queue 206 can point to one of input data 208A–208I. In one embodiment, these requests are 32 bytes in size. The types of requests can comprise different security operations including the macro security operations described below in conjunction with FIGS. 3–8. Additionally, such security operations could include, but are not limited to, a request to (1) generate a random number, (2) generate a prime number, (3) perform modular exponentiation, (4) perform a hash operation, (5) generate keys for encryption/decryption, (6) perform a hash-message authentication code (H-MAC) operation, (7) perform a handshake hash operation and (8) perform a finish/verify operation.

Figure 3:
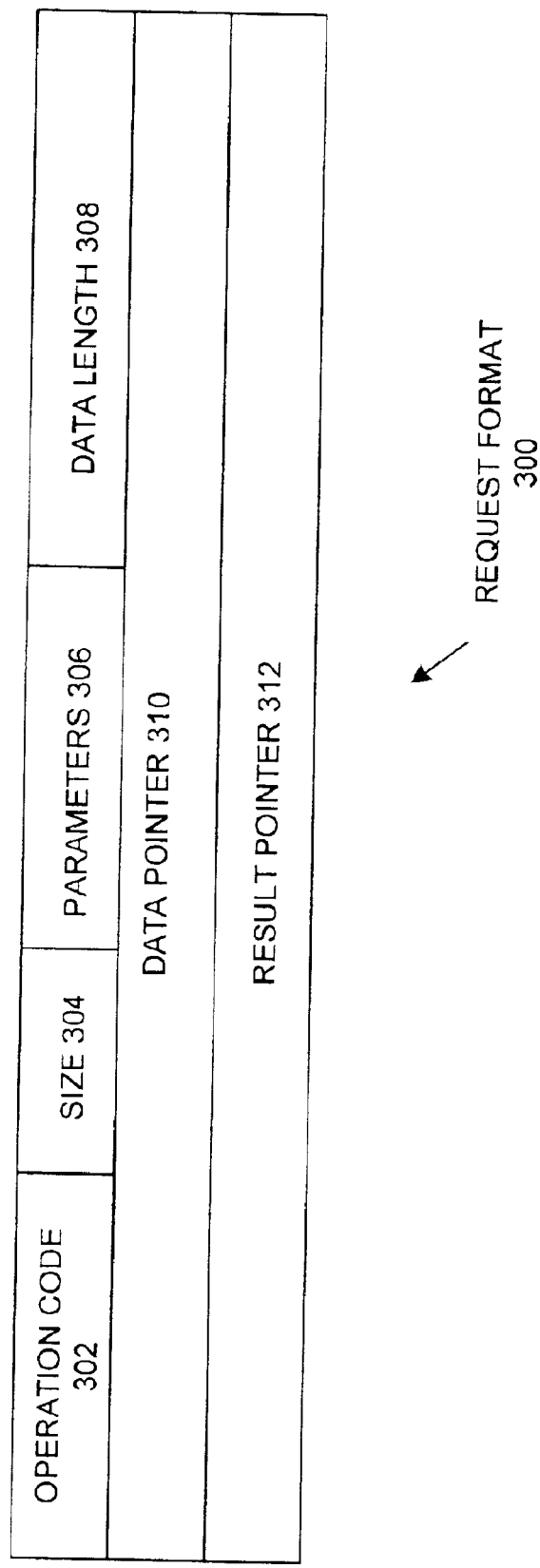
FIG. 3 illustrates an example of a request format for processing by coprocessor 212, according to embodiments of the present invention.

FIG. 3 illustrates an exemplary request format for processing by coprocessor 212, according to embodiments of the present invention. In particular, FIG. 3 illustrates request format 300 that includes operation code 302, size 304, parameters 306, data length 308, data pointer 310 and result pointer 312. Operation code 302 includes the op-code to identify the different security operations to be performed by coprocessor 212, such as an op-code for hashing, modular exponentiation, etc. Size 304 can define sizes for different data related to the operation depending on the type of operation. For example, size 304 for a modular exponentiation operation could include the size of the modulus or for a hash operation could include the size of the data to be hashed.

Similar to size 304, parameters 306 can define different data related to the operation depending on the type of operation. For example, for the operation for the generation of keys for encryption/decryption, parameters 306 could define the length of the pre-master for the key. To further illustrate parameters 306, for the operation for the H-MAC operation, parameters 306 could define the length of the secret. In one embodiment, parameters 306 remain undefined for certain operations.

Data length 308 defines the length of the data structure within the associated input data 208A–208I that is pointed to by data pointer 310 (within the request) and copied into coprocessor 212 for the security operation defined within the request. The data structure stored in the associated input data 208A–208I and pointed to by data pointer 310 can include different data depending on the type of security operation to be performed. In one embodiment, for given operations, this additional data structure is not needed, thereby making data pointer 310 unused. For example, for the operation to generate a random number, there is no input data stored within one of input data 208A–208I. To help illustrate the type of data to be stored within such data structures, for a key generation operation, the data structure could include the client random number, the server random number, the label and the pre-master number.

Result pointer 312 defines the location (one of output data 209A–209I) within host memory 204 where coprocessor 212 can write output results into a data structure. In one embodiment, this write operation is performed by a DMA write operation. Additionally, in an embodiment, a completion code is placed at the end of this data structure (which is further defined below). Returning to the key generation operation to help illustrate, the data structure stored in the associated output data 209A–209I could include the master key, the key material and the completion code.

Returning to FIG. 2, coprocessor 212 includes Peripheral Component Interconnect (PCI) unit 230, lightening data transport (LDT) unit 232, key unit 244, request unit 214, doorbell register 220, execution units 216A–216I, execution units 217A–217I, random number generator unit 218 and request buffer 222, which are coupled together. Additionally, PCI unit 230 and LDT unit 232 are coupled to system bus 210. PCI unit 230 and LDT unit 232 provide communication between the different components in coprocessor 212 and host memory 204, host processor 202 and request processing unit 234. While one embodiment is described in which PCI and LDT units are used to connect to a system bus, alternative embodiments could use different buses.

The number of execution units 216 and 217 and the number of random number generator units 218 are by way of example and not by way of limitation, as a lesser or greater number of such units can be included within coprocessor 212. A more detailed diagram and operation of execution units 217A–217I is described below in conjunction with FIG. 8. Random number generator unit 218 generates random numbers for the generation of keys. Key unit 244 can store keys locally within coprocessor 212 for execution units 217A–217I that can be subsequently used for processing of different security operations without requiring the retrieval of such keys from memory that is external to coprocessor 212. Request unit 214 extracts requests within request queue 206 based on values inserted into doorbell register 220 and distributes such requests to execution units 217A–217I for processing, which is described in more detail below. Request buffer 222 can store the requests extracted by request unit 214 for processing by execution units 216–217.

Macro Security Operations

Figure 4:
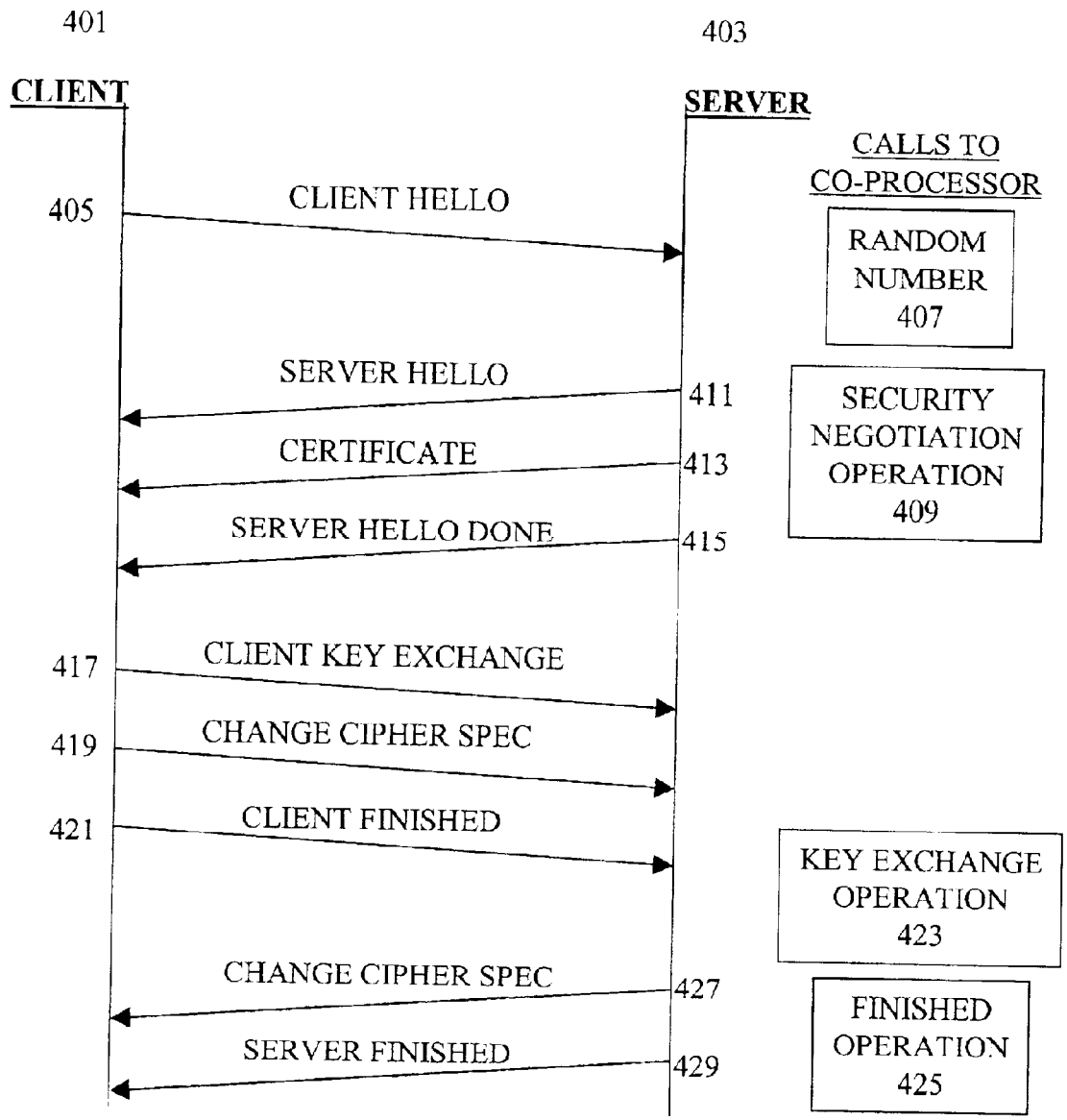
FIG. 4 is a diagram illustrating an exemplary establishment of a secure SSL 3.0 session according to one embodiment of the invention.

FIG. 4 is a diagram illustration an exemplary establishment of a secure SSL 3.0 session according to one embodiment of the invention. In FIG. 4, a client 401 and a server 403 exchange handshake messages to establish a secure session. The server 403 sends a set of security operations 407, 409, 423, and 425 to the coprocessor 212. Each of the set of security operations sent from the host processor 201 to the coprocessor 212 can be either a primitive security operation or a macro security operation. In the embodiment illustrated in FIG. 4, the set of security operations 409, 423, and 425 are macro security operations. Each macro security operation is performed by one of the execution units 216–217 of the coprocessor 212.

The client 401 initially transmits a client hello message 405 to the server 403. The client 403 may optionally send additional messages. The host processor 201 of the server 403 calls a random number security operation 407 to be executed by the coprocessor 212. The random number generator 218 generates and stores a random number(s) in response to the random number operation 407. In one embodiment of the invention, the random number operation 407 is a primitive security operation resulting in generation of a single random number. In another embodiment of the invention, the random number security operation is a macro security operation resulting in generation of a vector of random numbers. In an alternative embodiment of the invention, the host processor 201 calls the random number operation 407 to be executed by a random number generator 218 located separately from the coprocessor 212. In another embodiment of the invention, random numbers are generated in advance of establishing the session. After the random number(s) is generated, the server 403 sends the security negotiation operation 409 to the coprocessor 212.

After executing the security negotiation operation 409, the coprocessor 212 creates a partial hash of the accumulated handshake messages (the client hello 405 and any optional messages). The server 403 uses the random number (s) and the data resulting from execution of the security negotiation operation 409 by the coprocessor 212 to create a set of messages transmitted to the client 401. The server 403 transmits a server hello message 411, a certificate 413, and a server hello done message 415. In another embodiment of the invention, additional optional messages are transmitted to the client 401.

In the key exchange phase of establishing the SSL 3.0 secure session, the client 401 transmits a client key exchange message 417, a change cipher spec message 419, and a client finished message 421. After the server 403 receives this set of messages, 417, 419, and 421 the host processor 201 on the server 403 calls a key exchange operation 423 and a finished operation 425 to be executed by the coprocessor 212. As a result of executing the key exchange security operation 423, the coprocessor 212 creates 1) a decrypted pre-master secret, 2) a master secret and key material, and 3) a partial hash of the accumulated handshake messages (the hashed client hello 405 and the set of messages 417, 419, and 421). As a result of executing the finished operation 425, the coprocessor 212 generates 1) a decrypted client finished message, 2) a finished hash for the client finished message 421, 3) a finished hash for a server finished message 429, and 4) an encrypted server finished message with its message authentication code (MAC). Using the data from the key exchange operation 423 and the finished operation 425, the server 403 1) verifies the messages received from the client 401 and 2) transmits a change cipher spec message 427 and a server finished message 429 to the client 401.

FIG. 5 is a table illustrating groups of primitive security operations for the macro security operations illustrated in FIG. 4 according to one embodiment of the invention. The negotiation security operation 407, the key exchange operation 409, and the finished operation 425 are identified in a column labeled "Macro Security Operations." The table shows the group of primitive security operations executed by one of the execution units 216–217 of the coprocessor 212 when performing each of these macro security operations. When performing the security negotiation operation 407, one of the execution units 216–217 executes 2 hash operations. To perform the key exchange operation 409, one of the execution units 216–217 executes the following: 1) a decrypt operation; 2) a group of modular arithmetic operations; and 3) 22 hash operations (78 hash operations if establishing a secure session according to TLS). To perform the security negotiation operation 407, one of the execution units 216–217 will execute 23 primitive security operations for SSL 3.0, according to one embodiment of the invention. To perform the finished operation 409, one of the execution units 216–217 executes the following: 1) a decrypt operation; 2) an encrypt operation; and 3) 12 hash operations. One of the execution units 216–217 performing the finished operation 407 executes 14 primitive security operations.

The association of primitive security operations to macro security operations can be implemented in a variety of ways. Various implementations of the described invention may group primitive security operations for a macro security operation differently depending on factors that can include the security protocol, data dependencies, etc.

Figure 6:
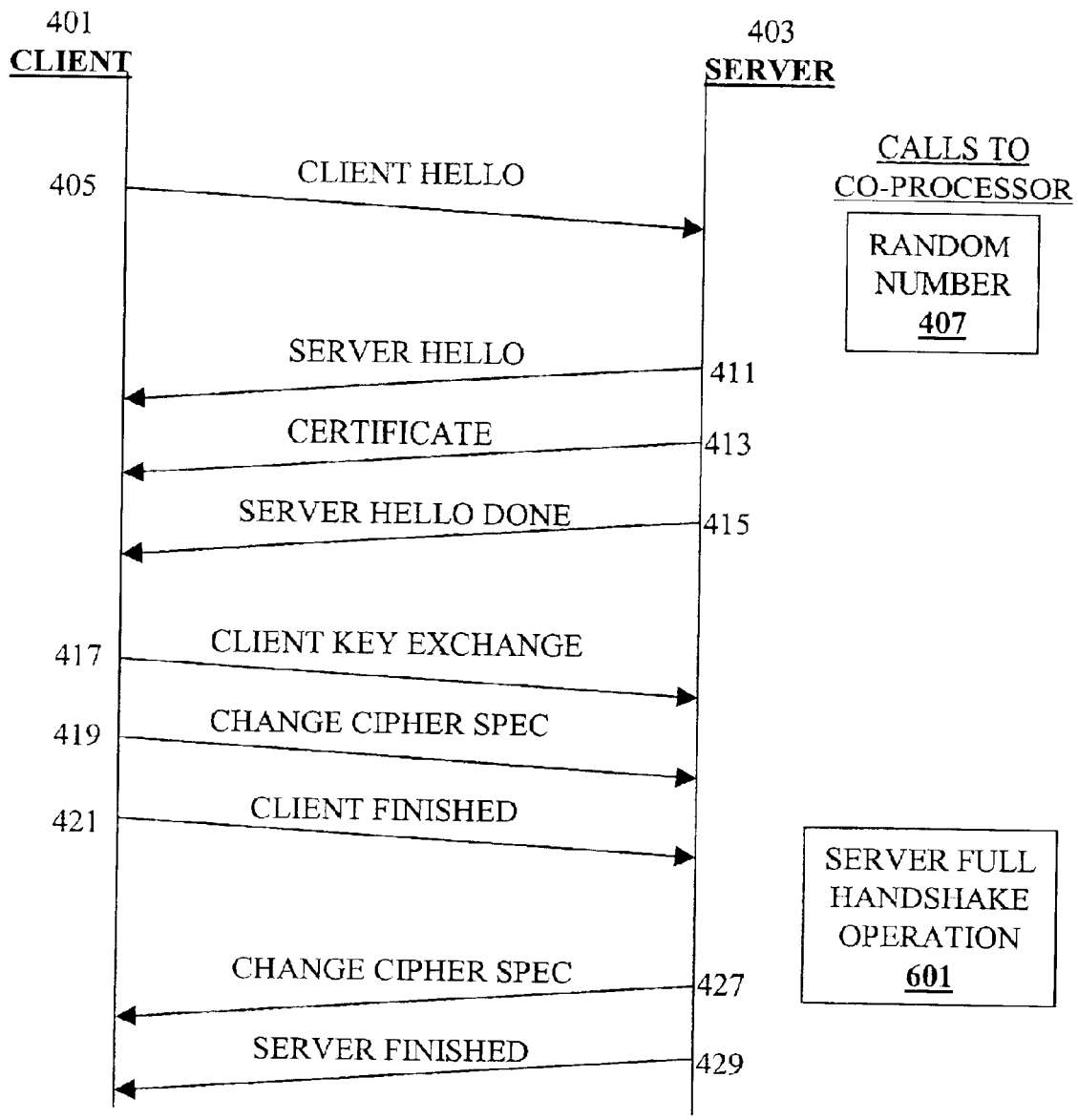
FIG. 6 is a diagram illustrating an exemplary establishment of a secure session according to one embodiment of the invention.

FIG. 6 is a diagram illustrating an exemplary establishment of a secure session according to one embodiment of the invention. In FIG. 6, a different implementation of macro security operations is illustrated for the secure session establishment illustrated in FIG. 4. In FIG. 6, a server full handshake operation 601 is called instead of the macro security operations 407, 409, and 423. The server full handshake macro security operation 601 is called after the server 403 receives the set of messages 417, 419, and 421 from the client 401. With a single call, the coprocessor 212 (not including a call for random numbers) provides all the necessary data to the host processor 201 for establishing the secure session.

FIG. 7 is a table illustrating a group of primitive operations for the server full handshake operation 701 according to one embodiment of the invention. One of the execution units 216–217 performing the server full handshake operation 601 executes the following primitive security operations: 1) a decrypt operation; 2) 2 encrypt operations; 3) a set of modular arithmetic operations; and 4) 35 hash operations. Thus, the execution unit executes approximately 39 primitive security operations to complete the server full handshake operation 601. In this example of the server full handshake operation 601, the client finished message 421 is not decrypted. The client finished message 421 is not decrypted because an expected client finished message is created by the coprocessor 212. Since the contents of the client finished message 421 are known by the server 403 before actually receiving the client finished message 421, the expected client finished message can be created and used to authenticate the received client finished message 421 without decrypting the client finished message 421.

A client full handshake operation could create an expected server finished message. With the client full handshake operation, a client with a coprocessor 212 can perform a single call to the coprocessor 212 for establishing the secure session before receiving the server finished message 429 from the server 401.

Thus, FIGS. 4–7 illustrate a couple examples of how primitive security operations can be grouped together to form macro security operations. It should be understood that any combination of such primitive security operations is within the scope of the invention. With macro security operations, a secure session can be established with a limited number of communications between the host processor 201 and the coprocessor 212 of the client 401 or the server 403. Fewer communication reduces consumption of system resources. Reduction in system resource consumption avoids decreased system performance. In addition, secure sessions can be established faster and a greater number of secure sessions can be maintained. Specifically, since the amount of processing required to process a macro security operation is greater than a primitive security operation, the allocation of operations to the different execution units in the security coprocessor allows for a greater throughput in spite of the overhead associated with such allocation.

Figure 8:
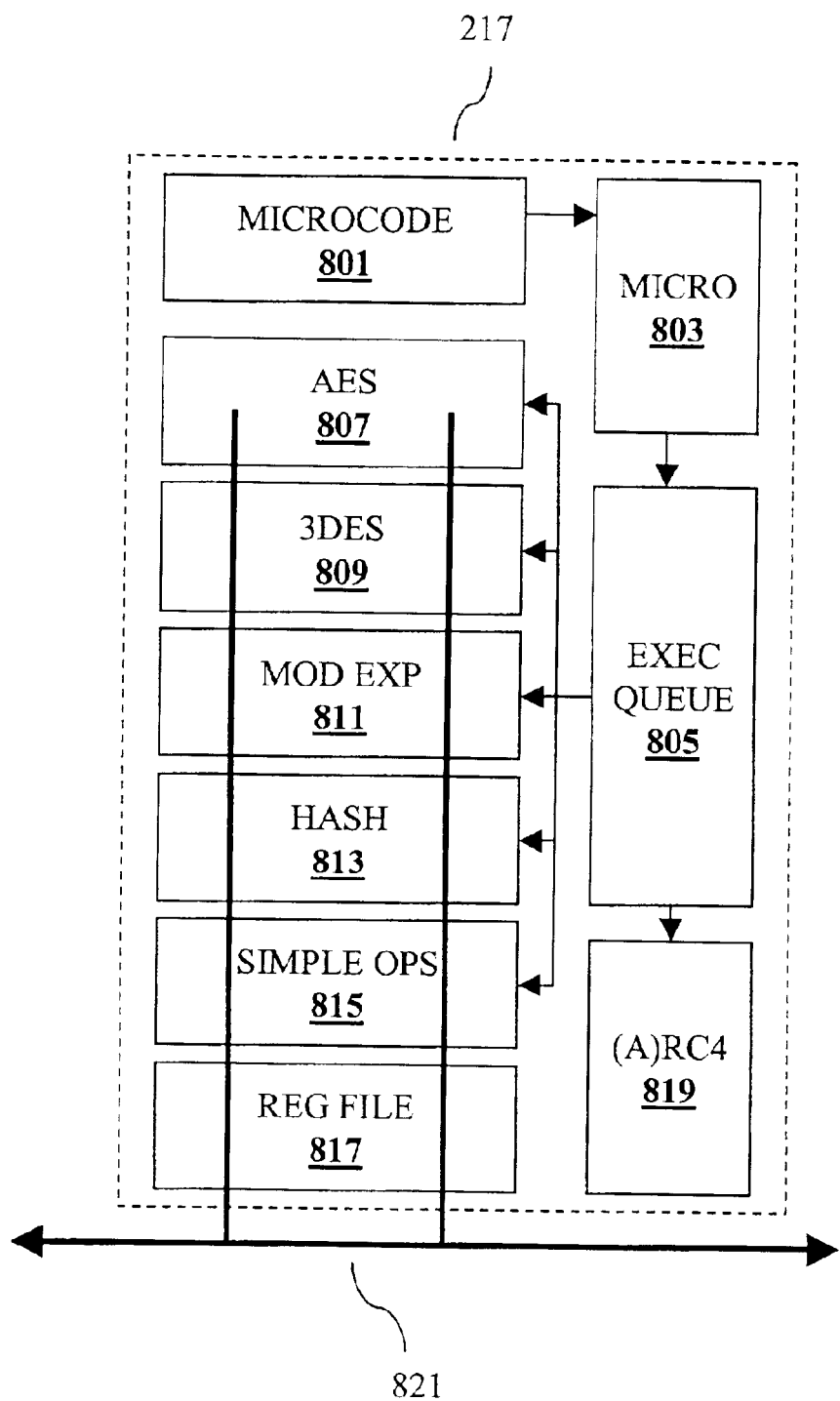
FIG. 8 is a diagram illustrating one of the execution units 216–217 according to one embodiment of the invention.

FIG. 8 is a diagram illustrating one of the execution units 216–217 according to one embodiment of the invention. In FIG. 8, a microcode block 801 is coupled to a microcontroller block 803. The microcontroller block 803 is coupled to an execution queue block 805. The execution queue block 805 is coupled to a set of primitive security operation blocks. The primitive security operation blocks include an Advanced Encryption Standard (AES) block 807, a Triple Data Encryption Standard (3DES) block 809, a modular exponentiation block 811, a hash block 813, a simple arithmetic and logic block 815, and an alleged RC4® block 819. Alternative embodiments of the invention may include additional primitive security operation blocks or fewer primitive security operation blocks. A bus 821 couples the primitive security operation blocks 807, 809, 811, 813, 819 and the register file block 817 together.

The microcode block 801 translates a security operation into one or more primitive security operations and passes the primitive security operation(s) to the microcontroller block 803. The microcontroller block 803 retrieves from the register file 817 the appropriate data for each of the primitive security operations. The primitive security operations are placed into the execution queue 805 by the microcontroller block 803. When a primitive security operation's corresponding primitive security operation block is able to perform the primitive security operation, the execution queue 805 pushes the primitive security operation to the appropriate primitive security operation block 807, 809, 811, 813, 815, or 819. Once a primitive security operation block 807, 809, 811, 813, 815, or 819 has executed the primitive security operation, the primitive security operation block either passes the results to the register file 817 or onto the bus 821. The result of the security operation of the request from the host processor 201 (be it a macro or a primitive security operation), is then caused to be transferred by the execution unit 216–217 via a DMA transfer to the appropriate location in the main memory.

While one embodiment is described in which each execution unit has its own microcode block, alternative embodiments have one or more execution units share a single microcode block. Yet other embodiments have a central microcode block (e.g., in SRAM) whose contents are loaded upcoming power-up into local microcode blocks in each of the execution units. Regardless of the arrangement of the microcode block(s), in certain embodiments the microcode blocks are reprogrammable to allow for flexibility in the selection of the security operations (be they macro and/or primitive security operations) to be performed.

A network element acting as a router, switch, access to a storage farm, etc., may establish one or more secure sessions. Macro security operations enable the network element to establish multiple secure sessions without consuming large amounts of system resources. Moreover, the secure sessions can be established faster with macro security operations.

For example, the coprocessor 212 may receive 3 requests to establish secure SSL 3.0 sessions. If the server full handshake operation 701 is implemented, then the host processor 201 can establish the secure sessions with 3 calls to the coprocessor 212. The execution units 216–217 can perform the 3 operations in parallel. A more granular set of macro security operations may be implemented on the server similar to the macro security operations described in FIG. 4 and FIG. 5. For example, the macro security operations described in FIG. 4 and FIG. 5 may be implemented on the server 403 that has received 2 requests for secure sessions. After the host processor 201 calls the coprocessor 212 to perform the client key exchange operation 423 for each of the two requested sessions, the server 403 receives a third request for a secure session. The host processor 201 calls the coprocessor 212 to perform the security negotiation operation 409 for this third secure session request. Although the request unit 214 of the coprocessor 212 issues the security negotiation operation 409 to one of the execution units 216–217 after issuing two client key exchange operations 423 to two of the execution units 216–217, the one of the execution units 216–217 that performs the security negotiation operation 409 will complete execution of the operation 409 before the other two of the execution units 216–217 complete execution of their operations (assuming the security negotiation operation 409 requires less time than the key exchange operation 423). Hence, operations from the host processor 201 may be issued to the execution units 216–217 in order, but completed by the execution units 216–217 out of order.

Utilizing the coprocessor 212 to perform functions for establishing secure sessions increases the efficiency of a system and its host processor 201. The coprocessor 212 enables establishment of secure sessions with less consumption of host processor 201 resources. More secure sessions can be established at a faster rate. In addition, the overall performance of a system will improve since the host processor 201 can use resources previously expended for security functions. These host processor 201 resources can be applied to system monitoring, traffic monitoring, etc.

Furthermore, the parallel and out-of-order characteristics of the execution units 216–217 provide flexibility for implementing security operations. Various levels of granularity of macro security operations can be implemented to meet varying needs of a customer. While embodiments have been described that allow for out-of-order completion, alternative embodiments include hardware to require the in-order completion of requests.

In one embodiment, the request processing unit 234 is a coprocessor driver executed by the host processor. In one embodiment of the invention, the coprocessor driver interfaces with a modified version of Open SSL. The modified version of Open SSL is changed such that it communicates macro security operations to the driver as opposed to primitive security operations.

Processing of Security Operations by Request Processing Unit 234

While system performance can be improved by reducing the number of communications between the host processor and the security coprocessor for a given secure session through the use of macro security operations, a manner of communicating tasks and results between the host processor and the security coprocessor that is more conductive to the coprocessor architecture can improve performance. Specifically, as previously indicated, another aspect of the invention is the communication of tasks and results between a host processor and a security coprocessor, where the coprocessor has multiple execution units. More specifically, a continuous flow capable task delivery and result return mechanism is used. A continuous flow capable task delivery and result return mechanism allows the host processor to continually add tasks (as long as the queue is not full) and the security coprocessor to continually return results (as opposed to a mechanism that requires a block of work to be completed by the coprocessor before another block of work can be transferred to the security coprocessor by the host processor). While FIGS. 2, 9 and 10 illustrate one implementation of a non-interrupt driven, continuous flow mechanism, alternative embodiments may use different continuous flow mechanisms.

Figure 9:
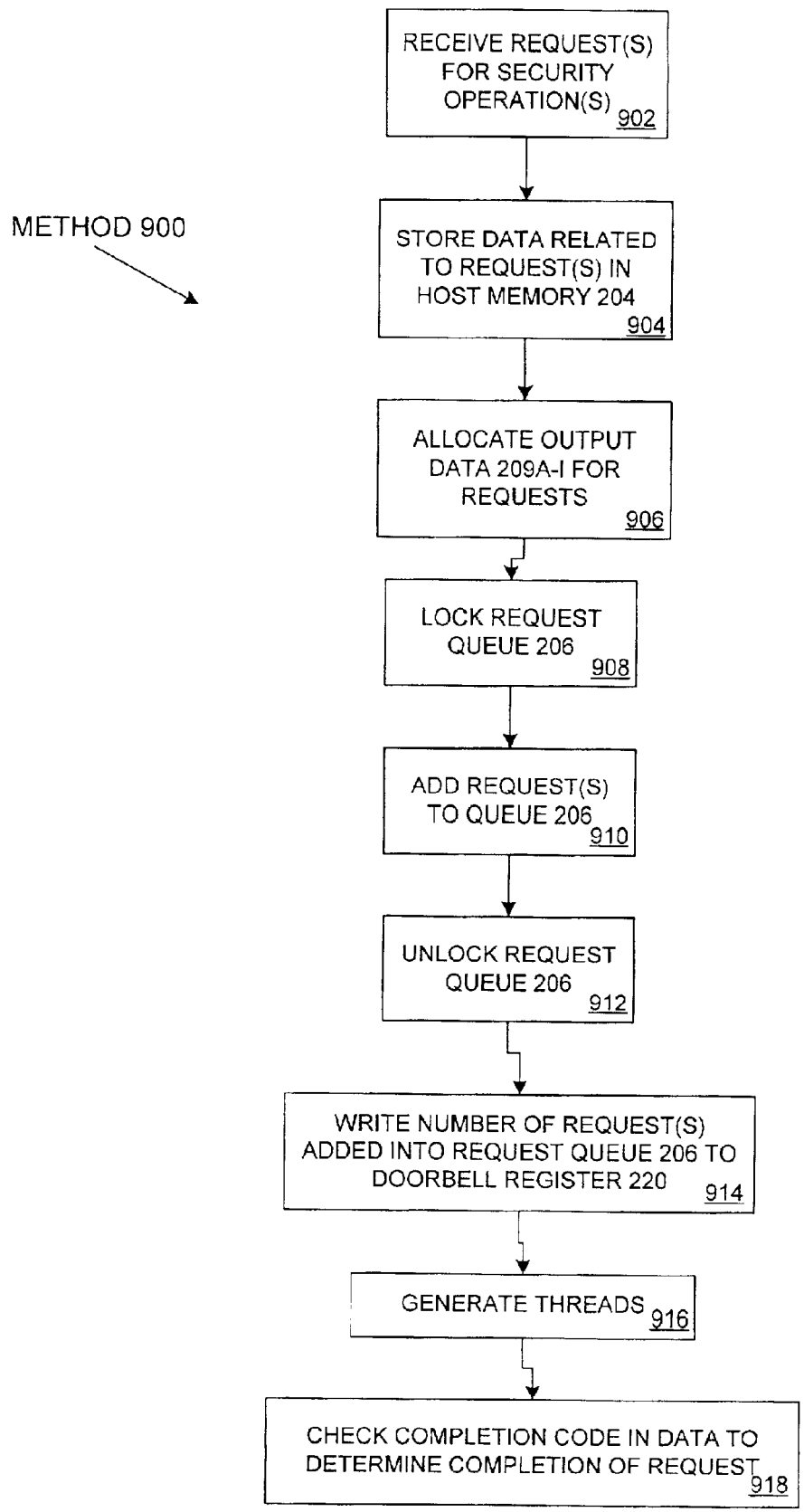
FIG. 9 illustrates a flow diagram for the processing of requests by request processing unit 234, according to embodiments of the present invention.
Figure 10:
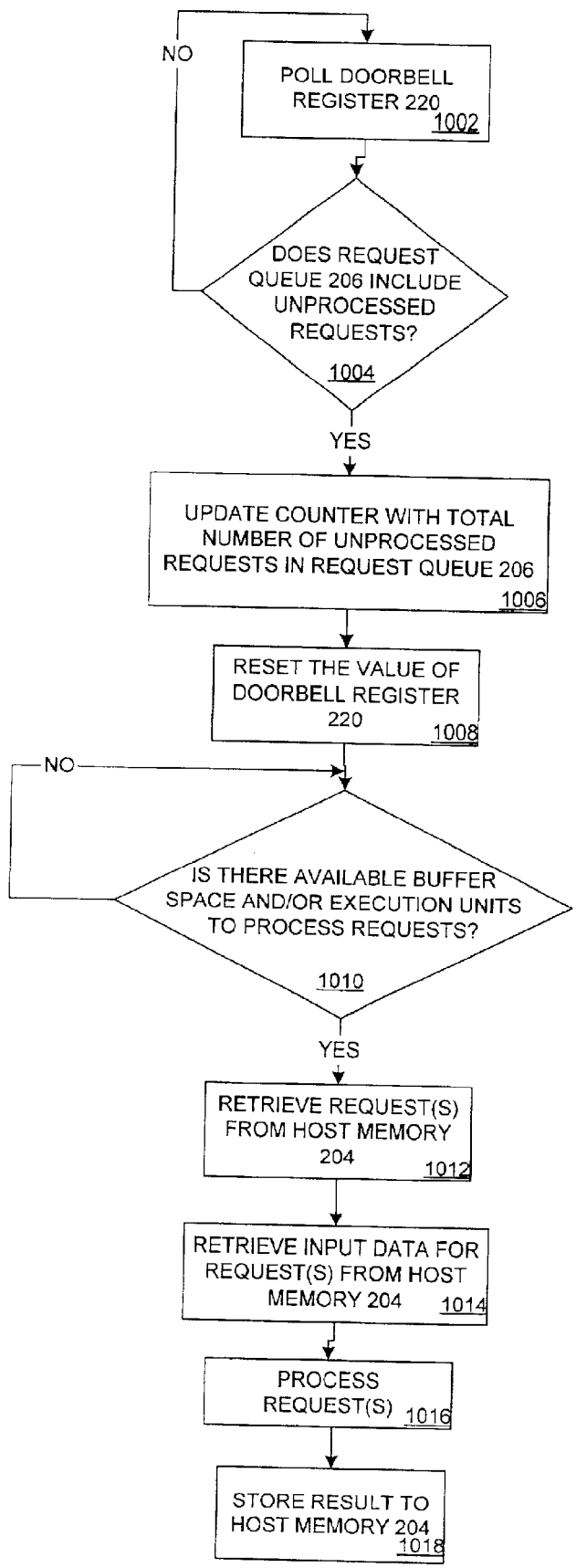
FIG. 10 illustrates a flow diagram for the processing of requests by coprocessor 212, according to embodiments of the present invention.

To further illustrate the processing of the security operations, FIG. 9 illustrates a flow diagram for the processing of requests by request processing unit 234 (shown in FIG. 2), according to embodiments of the present invention. Method 900 commences with the receipt of one to a number of requests for security operations, at process block 902. In an embodiment, the request includes the macro operations and/or primitive operations described above. In one embodiment, request processing unit 234 stores data associated with the request, such as operands for the security operations, into one of input data 208A–208I, at process block 904. In particular, this data may be required to be stored external to request queue 206 due to the size constraints placed on an entry into request queue 206. In an embodiment, this additional data storage is not required, as all of the associated data can be stored within a request within request queue 206.

Additionally, request processing unit 234 allocates memory space for output data 209A–209I for those requests to be stored in request queue 206, at process block 906. In one embodiment, request processing unit 234 sets the value of the completion code within the associated output data 209A–209I to a value that does not indicate that the request is complete. For example, in one such embodiment, a value of zero indicates that the request is complete, and therefore, request processing unit 234 sets this value to a non-zero number.

Further, request processing unit 234 locks request queue 206, at process block 908. Accordingly, this locking precludes other units or processes from writing requests into request queue 206. Although different techniques can be employed for locking request queue 206, in one embodiment, request processing unit 234 locks request queue 206 through a software lock using a semaphore. Request processing unit 234 adds the request(s) into request queue 206, at process block 910. As described above in conjunction with FIG. 3, request can include the operation code to be performed by units within coprocessor 212, a pointer to other data related to the operation that is stored in one of input data 208A–208I and a pointer to the location in host memory 204, such as output data 209A–209I, where the output results are to be placed by coprocessor 212 after completion of the given request. Request processing unit 234 unlocks request queue 206 after adding the request(s), at process block 912.

Request processing unit 234 writes the number of request (s) that were added into request queue 206 to doorbell register 220 (located on coprocessor 212), at process block 914. In one embodiment, this write operation is performed through a direct memory access (DMA) write operation. Although described as a register, the data to be stored in doorbell register 220 could include any other type of memory within coprocessor 212.

Request processing unit 234 also generates threads for execution on host processor 202, at process block 916. In one embodiment, a thread is created for a given security session, such as a SSL 3.0 session. In one embodiment, request processing unit 234 creates a different thread for each request that is inserted into request queue 206. These threads check for the completion of their associated requests by monitoring the completion code stored in the related output data 209A–209I, at process block 918.

In one embodiment, request processing unit 234 puts the thread to sleep when the associated request is placed into request queue 206 and sets a timer to wake the thread. Accordingly, when the thread commences processing, it checks the completion code within the related output data 209A–209I to determine if the request is complete. In one embodiment, request processing unit 234 sets the value of this timer based on the particular request to be performed. For example, if a first request for generating a random number is typically processed by coprocessor 212 in a short duration in comparison to a second request for a key generation operation, request processing unit 234 sets the values of their timers accordingly. In other words, the first request would have a timer of shorter duration in comparison to the timer of the second request. In one embodiment, request processing unit 234 keeps the thread awake for a predetermined time and places the thread to sleep upon determining that the request is not been completed in during this time frame. In one embodiment, request processing unit 234 blocks on the event of the completion code being set by coprocessor 212 for the given request. While embodiments have been described in which request processing unit 134 uses threads to check completion codes, alternative embodiments could employ other mechanisms (e.g., request processing unit 134 could check each of the completion codes).

In one embodiment, upon completion of the request by coprocessor 112, the associated thread can delete the requests, the associated input data 208 and/or output data 209 from host memory 204. In one embodiment, the request and the associated input data 208 are deleted from request queue 206 when the request is extracted by request unit 214, while the associated output data 209 is deleted by the associated thread once the thread has finished with the contents within output data 209.

Processing of Security Operations by Coprocessor
212

FIG. 10 illustrates a flow diagram for the processing of requests by coprocessor 212, according to embodiments of the present invention. Method 1000 commences with polling of doorbell register 220 by request unit 214, at process block 1002. This polling of doorbell register 220 is shown in one process block. However, embodiments of the present invention are not so limited, as this polling of doorbell register 220 can occur on a periodic basis such that request unit 214 can be performing this polling while the functionality illustrated in other process blocks is occurring. For example, this polling by request unit 214 can be executing at the same time that one of execution units 216–217 are processing the requests (in process block 1012 illustrated below). In one embodiment, request unit 214 polls doorbell register 220 every clock cycle.

Additionally, request unit 214 determines whether request queue 206 includes requests based on the value stored in doorbell register 220, at process decision block 1004. Request unit 214 can access a number of memory locations, local to coprocessor 212 to determine the size and location of request queue 206. A first memory location is the base address of request queue 206, and a second memory location is the length of request queue 206. In one embodiment, these memory locations are registers within coprocessor 212. In an embodiment, request processing unit 234 sets these memory locations to appropriate values during initialization.

In one embodiment, the value stored into doorbell register 220 by request processing unit 234 is the number of requests that were added to request queue 206 (not the total number of requests in request queue 206). Accordingly, upon determining that request queue 206 does not include requests, request unit 214 polls doorbell register 220 again, at process block 1002. In contrast, upon determining that request queue 206 does include requests, request unit 214 updates a counter with the total number of requests in request queue 206, at process block 1006. In one embodiment, this counter is local memory within coprocessor 212, such as a register. To help illustrate the updating of this counter, if the value stored in this counter is 25 and doorbell register 220 has a value of five, request unit 214 adds the two values together (for a total of 30) and stores the result in the counter. Additionally, request unit 214 resets the value stored in doorbell register 220 to zero, at process block 1008.

However, embodiments of the present invention are not so limited, as other techniques can be employed in tracking the number of requests in request queue 206. For example, in one embodiment, one memory location is used to store the total number of requests within process queue 206 that can be updated by both request processing unit 234 and request unit 214, using for example semaphores to allow for updating of a single memory location by multiple units.

At process block 1006, request unit 214 determines whether one of the number of execution units 216–217 is able to process the requests and/or space is available within request buffer 222 within coprocessor 212 to store requests extracted from request queue 206. In particular, in one embodiment, coprocessor 212 includes request buffer 222 to store requests received from request queue 206 that are to be processed by one of the execution units 216–217. As in the described embodiment illustrates in FIG. 8, each of the number of execution units 216–217 includes or has access to the microcode that enables such units to execute a number of different security operations, including, but not limited to, those described above (in conjunction with the description of the different requests). In other words, a given one of execution units 216–217 is not limited to a given function, such as a hash operation, while a one of the other execution units 216–217 is limited to the generation of keys for security operations. Rather, each of the number of execution units 216–217 is able to perform a number of different primitive and macro security operations.

Upon determining that there is no available buffer space within coprocessor 212 for storage of the requests locally and/or available execution units 216–217 to process such requests, request unit 214 continues checking for this available buffer space or execution units 216–217, at process decision block 1010. In one embodiment, request unit 214 may determine such availability from signals received from execution units 216–217 or other control circuitry within coprocessor 212. Conversely, upon determining that there is available buffer space within coprocessor 212 for storage of the requests locally and/or available execution units 216–217 to process such requests, request unit 214 retrieves one to a number of requests from request queue 206, at process block 1012. In one embodiment, request unit 214 retrieves one to a number of such requests from request queue 206 using a DMA read operation.

Additionally, request unit 214 retrieves the associated input data 208A–208I for these requests from host memory 204, at process block 1014. In one embodiment, input data 208A–208I are contiguously stored in host memory 204. In one such embodiment, request unit 214 retrieves this associated input data 208A–208I using a single DMA read due to the contiguous storage of such data. Accordingly, only two DMA operations are needed for the transferring of multiple requests to coprocessor 212, thereby increasing the overall processing speed for given security operations.

The units (including request unit 214, execution units 216–217 and random number generator unit 218) within coprocessor 212 process the requests, at process block 1016. Request unit 214 distributes or administers these retrieved requests to execution units 216–217 and random number generator unit 218. Because in one embodiment, each execution unit 216–217 is able to process any of the different types of security operations received, request unit 214 is able to transmit a request to the first of execution units 216–217 that is available for processing such requests.

For a given request, once one of execution units 216–217 completes the processing of the request, this execution unit 216–217 stores the result of this request in the location (one of output data 209A–209I) in host memory 204 pointed to by result pointer 212 of the request (shown in FIG. 3), at process block 1016. In addition to the actual result of the operation within the request, execution units 216–217 write a value within the completion code, such as a non-zero value, indicating that the request is complete. In one embodiment, execution units 216–217 write the results and the completion code by employing a DMA write operation. Accordingly, in one embodiment, three total DMA operations are required for a given request (including the DMA read for the request, the DMA read for the input data and the DMA write for the output result). Additionally, because multiple requests can be read from host memory 204 for a given DMA operation, the total number of DMA operations approaches approximately two, thereby limiting the overall bus transfers across system bus 210, which can be costly in terms of the time for processing of the security operations.

Moreover, as illustrated, because coprocessor 212 includes a number of execution units that can each execute the different security operations and can do so independently of other security operations being processed by other execution units, these requests can be executed and/or completed (and outputting the result to host memory 204) out-of-order in comparison to the order the requests were in within request queue 206. For example, a first request could include a key generation operation for a first SSL operation, while a second request could include a modular exponentiation operation for second SSL session, such that the first request is stored in and extracted from request queue 206 prior to the second request. Typically the second request is processed more quickly than the first request by execution units 216–217. Accordingly, the processing of the second request could complete prior to the processing of the first request even though the first request was transmitted to coprocessor 212 first based on the order of the requests in request queue 206.

Thus, one embodiment is described in which the requests are treated as independent of each other by the hardware. If there is a dependency that requires a particular order of completion between any requests, that order is enforced by the software in this embodiment. However, alternative embodiments include hardware that enforces in-order completion of the requests.

Memory described herein includes a machine-readable medium on which is stored a set of instructions (i.e., software) embodying any one, or all, of the methodologies described herein. Software can reside, completely or at least partially, within this memory and/or within processors described herein. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media; optical storage media, flash memory devices, electrical, optical, acoustical, or other form of propagated signals (e.g., carrier waves, infrared signals, digital signals, etc.), etc.

Thus, a method and apparatus for processing security operations have been described. Although the present invention has been described with reference to specific exemplary embodiments, it will be evident that various modifications and changes may be made to these embodiments without departing from the broader spirit and scope of the invention. For example, in alternative embodiments, the host processor could employ interrupts to communicate with the security coprocessor, while allowing the security coprocessor to employ DMA operations to communicate with the host memory. Alternatively, the security coprocessor could employ interrupts for its communication with the host processor, while the host processor employs DMA operations for its communications with the coprocessor. Accordingly, the specification and drawings are to be regarded in an illustrative rather than a restrictive sense.

What is claimed is:

1. A method comprising:
    retrieving, by a request unit, a number of requests for security operations from a host memory, wherein the number of requests are in an order within the host memory;
    distributing, by the request unit, the number of requests for the security operations to a number of execution units, wherein the distribution is based on availability of the number of execution units;
    processing the number of requests for the security operations by the number of execution units; and
    outputting results of the number of requests for the security operations to locations within the host memory, wherein an order of outputting of the results can be different from the order of the requests within the host memory.

2. The method of claim 1, wherein the number of requests relate to a number of different secure sockets layer sessions, wherein the number of requests can be independent of one another.

3. The method of claim 1, wherein a time to process one of the number of requests can be different from a time to process another of the number of requests.

4. The method of claim 1, wherein each of the number of execution units can process any of the different types of the security operations within the number of requests.

5. The method of claim 1, wherein a request can include a macro security operation.

6. The method of claim 1, wherein retrieving of the number of requests comprises retrieving the number of requests from a queue in the host memory using a first direct memory access (DMA) read operation for the number of requests and retrieving input data structures related to the number of requests from the host memory using a second DMA read operation.

7. The method of claim 6, wherein outputting the results of the number of requests comprises outputting the results of the number of requests using a DMA write operation.

8. The method of claim 7, wherein retrieving of one of the number of requests and outputting of the one of the number of requests includes approximately two DMA operations.

9. The method of claim 1, wherein the outputting of the results of the number of requests for the security operations to locations within the host memory includes outputting the results of the number of requests for the security operations to locations within the host memory based on pointers stored in the number of requests.

10. The method of claim 1, wherein outputting results of the number of requests for the security operations to locations within the host memory includes setting a value of a completion code at the locations within the host memory, the completion code to indicate completion of the request.

11. A method executing on a host processor, the method comprising:
    storing a number of requests for security operations within a request queue within a host memory, wherein the number of requests are in an order within the request queue;
    storing data related to the number of requests for security operations into a number of input data structures within the host memory;
    allocating a number of output data structures within the host memory, wherein a coprocessor is to write results of the number of requests for the security operations into the number of output data structures, wherein the coprocessor can write the results in an order that is different from the order of the requests within the request queue; and
    for each of the number of requests, allocating a thread for execution on the host processor, wherein the thread periodically checks a value of a completion code stored in the output data structure for the associated request, the completion code to indicate that the request is completed by the coprocessor.

12. The method of claim 11, wherein the request queue is locked during the storing of the number of requests within the request queue.

13. The method of claim 11, further comprising writing a number of the number of requests stored within the request queue into a memory location on the coprocessor.

14. The method of claim 11, wherein each thread of execution is associated with a different security socket layer session.

15. The method of claim 11, wherein the thread of execution checks the value of the completion code for the associated request independent of other threads of execution.

16. The method of claim 11, wherein at least one of the number of requests include a macro security operation.

17. A processor comprising:
    a number of execution units to process a number of requests for security operations, wherein the number of execution units are to output the results of the number of requests to a number of output data structures associated with the number of requests within a remote memory based on pointers stored in the number of requests and wherein the number of execution units can output the results in an order that is different from the order of the requests in a request queue; and
    a request unit coupled to the number of execution units, wherein the request unit is to retrieve a portion of the number of requests from the request queue within the remote memory and associated input data structures for the portion of the number of requests from the remote memory and wherein the request unit is to distribute the retrieved requests to the number of execution units based on availability for processing by the number of execution units.

18. The processor of claim 17, wherein the number of requests relate to a number of different secure sockets layer sessions, wherein the number of requests can be independent of one another.

19. The processor of claim 17, wherein a time to process one of the number of requests can be different from a time to process another of the number of requests.

20. The processor of claim 17, wherein each of the number of execution units can process any of the different types of the security operations within the number of requests.

21. The processor of claim 17, wherein a request can include a macro security operation.

22. The processor of claim 17, wherein the request unit is to retrieve the number of requests from the request queue using a first direct memory access (DMA) read operation and wherein the request unit is to retrieve the number of associated input data structures using a second DMA read operation.

23. The processor of claim 22, wherein the number of execution units are to output the results of the number of requests to the number of output data structures using a DMA write operation.

24. A system comprising:
a host processor coupled to a system bus;
a host memory coupled to the system bus, wherein the host memory is to store,
  a request queue to include a number of requests for security operations, wherein the number of requests are in an order within the request queue;
  a number of input data structures to include data associated with the number of requests; and
  a number of output data structures to include results from processing of the number of requests; and
a coprocessor coupled to the system bus, wherein the coprocessor comprises,
  a number of execution units to process the number of requests for security operations, wherein the number of execution units are to output the results of the number of requests to the number of output data structures associated with the number of requests based on pointers stored in the number of requests and wherein the number of execution units can output the results in an order that is different from the order of the requests in the request queue; and
  a request unit coupled to the number of execution units, wherein the request unit is to retrieve a portion of the number of requests from the request queue and associated input data structures for the portion of the number of requests from host memory and wherein the request unit is to distribute the retrieved requests to the number of execution units based on availability for processing by the number of execution units.

25. The system of claim 24, wherein the number of requests relate to a number of different secure sockets layer sessions, wherein the number of requests can be independent of one another.

26. The system of claim 24, wherein a time to process one of the number of requests can be different from a time to process another of the number of requests.

27. The system of claim 24, wherein each of the number of execution units can process any of the different types of the security operations within the number of requests.

28. The system of claim 24, wherein a request can include a macro security operation.

29. The system of claim 24, wherein the request unit is to retrieve the number of requests from the request queue using a first direct memory access (DMA) read operation and wherein the request unit is to retrieve the number of associated input data structures using a second DMA read operation.

30. The system of claim 29, wherein the number of execution units are to output the results of the number of requests to the number of output data structures using a DMA write operation.

31. A machine-readable medium that provides instructions, which when executed by a machine, causes the machine to perform operations comprising:
retrieving, by a request unit, a number of requests for security operations from a host memory, wherein the number of requests are in an order within the host memory;
distributing, by the request unit, the number of requests for the security operations to a number of execution units, wherein the distribution is based on availability of the number of execution units;
processing the number of requests for the security operations by the number of execution units; and
outputting results of the number of requests for the security operations to locations within the host memory, wherein an order of outputting of the results can be different from the order of the requests within the host memory.

32. The machine-readable medium of claim 31, wherein the number of requests relate to a number of different secure sockets layer sessions, wherein the number of requests can be independent of one another.

33. The machine-readable medium of claim 31, wherein a time to process one of the number of requests can be different from a time to process another of the number of requests.

34. The machine-readable medium of claim 31, wherein each of the number of execution units can process any of the different types of the security operations within the number of requests.

35. The machine-readable medium of claim 31, wherein a request can include a macro security operation.

36. The machine-readable medium of claim 31, wherein retrieving of the number of requests comprises retrieving the number of requests from a queue in the host memory using a first direct memory access (DMA) read operation for the number of requests and retrieving input data structures related to the number of requests from the host memory using a second DMA read operation.

37. The machine-readable medium of claim 36, wherein outputting the results of the number of requests comprises outputting the results of the number of requests using a DMA write operation.

38. The machine-readable medium of claim 37, wherein retrieving of one of the number of requests and outputting of the one of the number of requests includes approximately two DMA operations.

39. The machine-readable medium of claim 31, wherein the outputting of the results of the number of requests for the security operations to locations within the host memory includes outputting the results of the number of requests for the security operations to locations within the host memory based on pointers stored in the number of requests.

40. The machine-readable medium of claim 31, wherein outputting results of the number of requests for the security operations to locations within the host memory includes setting a value of a completion code at the locations within the host memory, the completion code to indicate completion of the request.

41. A machine-readable medium that provides instructions, which when executed by a host processor, causes the host processor to perform operations comprising:

storing a number of requests for security operations within a request queue within a host memory, wherein the number of requests are in an order within the request queue;

storing data related to the number of requests for security operations into a number of input data structures within the host memory;

allocating a number of output data structures within the host memory, wherein a coprocessor is to write results of the number of requests for the security operations into the number of output data structures, wherein the coprocessor can write the results in an order that is different from the order of the requests within the request queue; and for each of the number of requests, allocating a thread for execution on the host processor, wherein the thread periodically checks a value of a completion code stored in the output data structure for the associated request, the completion code to indicate that the request is completed by the coprocessor.

42. The machine-readable medium of claim 41, wherein the request queue is locked during the storing of the number of requests within the request queue.

43. The machine-readable medium of claim 41, further comprising writing a number of the number of requests stored within the request queue into a memory location on the coprocessor.

44. The machine-readable medium of claim 41, wherein each thread of execution is associated with a different security socket layer session.

45. The machine-readable medium of claim 41, wherein the thread of execution checks the value of the completion code for the associated request independent of other threads of execution.

46. The machine-readable medium of claim 41, wherein at least one of the number of requests include a macro security operation.

* * * * *

UNITED STATES PATENT AND TRADEMARK OFFICE
CERTIFICATE OF CORRECTION

| | | |
|---|---|---|
| PATENT NO. | : 6,789,147 B1 | Page 1 of 1 |
| APPLICATION NO. | : 10/025512 | |
| DATED | : September 7, 2004 | |
| INVENTOR(S) | : Richard E. Kessler et al. | |

It is certified that error appears in the above-identified patent and that said Letters Patent is hereby corrected as shown below:

In the Specification

Column 2, Line 51, delete "requests queue." and insert -- requests in the request queue. --;

Column 3, Line 12, delete "for" and insert -- from --; (Second Occurrence)

Column 4, Line 53, delete "fro" and insert -- for --;

Column 4, Line 59, delete "store" and insert -- stores --;

Column 6, Line 55, delete "illustration" and insert -- illustrating --;

Column 7, Line 2, delete "client 403" and insert -- client 401 --;

Column 8, Line 55, delete "server 401." and insert -- server 403. --; and

Column 10, Line 60, delete "conductive" and insert -- conducive --.

Signed and Sealed this
Twenty-ninth Day of December, 2015

Michelle K. Lee
*Director of the United States Patent and Trademark Office*